Nov. 14, 1939.                T. V. BUCKWALTER                2,180,315
                    BEARING FOR CROSSHEADS AND THE LIKE
                           Filed March 4, 1938
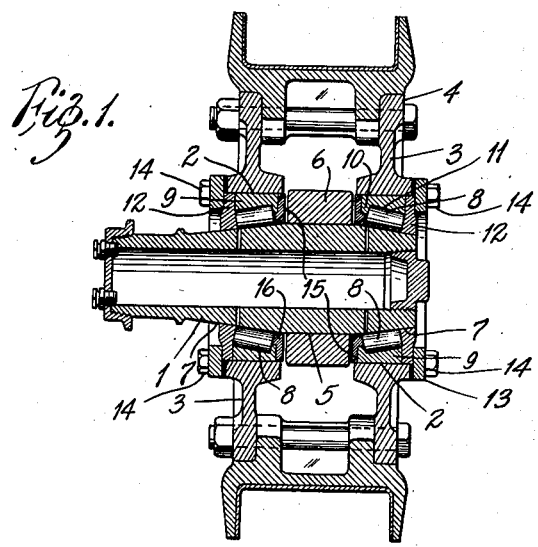
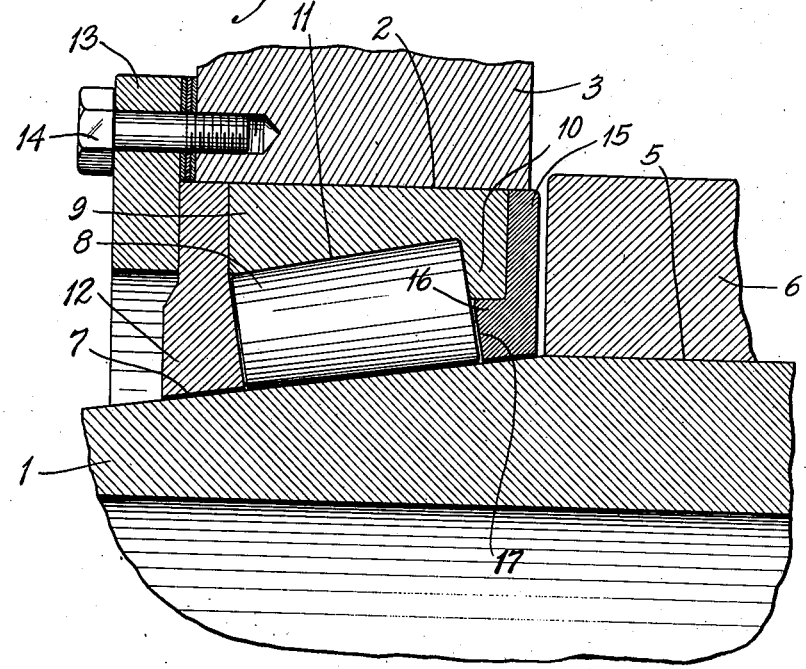
INVENTOR:
Tracy V. Buckwalter
by Carrot Carrot Knoessly
HIS ATTORNEYS.

Patented Nov. 14, 1939

2,180,315

UNITED STATES PATENT OFFICE 2,180,315

BEARING FOR CROSSHEADS AND THE LIKE

Tracy V. Buckwalter, Massillon, Ohio, assignor to The Timken Roller Bearing Company, Canton, Ohio, a corporation of Ohio Application March 4, 1938, Serial No. 193,829

3 Claims. (Cl. 308—6)

My invention relates to bearings for locomotive crossheads and the like, wherein a member located adjacent to the end of the bearing may creep axially or endwise into contact with the end of a bearing member, thus resulting in serious wear and galling of both members.

The invention has for its principal object to obviate the dangers above indicated. The invention consists principally in providing a taper roller bearing of the ribbed cup type with a wear or friction plate covering the end face of the cup and thrust rib and held in position by means of an annular flange pressed into the inner periphery of said thrust rib. The invention further consists in the parts and combinations and arrangements of parts hereinafter described and claimed.

In the accompanying drawing:

Fig. 1 is a longitudinal sectional view of a crosshead bearing mounting embodying my invention; and Fig. 2 is a fragmentary sectional view, on an enlarged scale, of the roller bearing and immediately associated parts.

Fig. 1 illustrates a crosshead bearing of the type shown in my Patent No. 2,037,209, wherein a wrist pin 1 extends through openings 2 in the arms 3 of the crosshead yoke member 4 and through an opening 5 in the locomotive main rod 6 which is disposed between said yoke arms. Said rod 6 is fixed on said pin 1.

The pin 1 has raceway portions 7 that taper away from said rod 6 and taper bearing rollers 8 are mounted on said raceway portions. Cups 9 or outer bearing members for said bearing rollers 8 are mounted in the arms 3 of said yoke member. Said cups 9 have internal thrust ribs 10 at the large ends of their raceways 11 for engagement with the large ends of the conical rollers 8.

At the outermost ends of said cups 9 are closure plates 12 that are mounted in the yoke arms 3 and held in position by means of positioning and adjusting rings 13 that are held by cap screws 14. These closure plates 12 serve as ribs for closely confining the small ends of the rollers 8 and they extend into close proximity with the raceway portions 7 of the pin 1.

Although fixed on said pin 1, there is danger that said rod 6 may creep axially of the pin into engagement with the end faces of an adjacent cup and thrust rib of the bearing illustrated in my said Patent No. 2,037,209, or other relative movement of the parts may bring about such engagement. According to the present invention, the end face of the cup 9 and thrust rib 10 is covered with a wear or friction plate 15 of bronze or other friction resistant metal, said plate extending into proximity with a raceway portion 7 of the pin and having an annular flange 16 on its inner face which is pressed into the inner periphery of the thrust rib 10, thereby securely holding the wear plate in the cup. Preferably, the inner face 17 of said annular flange is spaced away from the ends of the rollers 8.

The advantage of the present invention is that, if there should be engagement of the wear plate with the rod, said wear plate, being made of bronze or other bearing metal, will withstand rubbing engagement without damage to either the wear plate or the rod. In the event of wear on the friction plate, it can be replaced.

What I claim is:

1. A taper roller bearing mounting for locomotive crossheads and the like comprising a rod having an opening in its end, a pin mounted in said opening with its end projecting beyond said rod, a taper roller bearing on said projecting portion of said pin including taper rollers and a bearing member having a thrust rib engaging the large ends of said rollers, the outer face of said thrust rib and bearing member being adjacent to said rod, and a friction plate covering the end face of said bearing member and thrust rib and extending into close proximity with said rod, said plate having an annular flange overlapping the periphery of said thrust rib.

2. A taper roller bearing mounting for locomotive crossheads and the like comprising a rod having an opening in its end, a pin mounted in said opening with its end projecting beyond said rod, a taper roller bearing on said projecting portion of said pin including taper rollers and a bearing cup having an internal thrust rib engaging the large ends of said rollers, the outer face of said thrust rib and cup being adjacent to said rod, and a friction plate of bearing metal or the like covering the end face of said cup and thrust rib and extending into close proximity with said rod, said plate having an annular flange extending into the inner periphery of said thrust rib.

3. A taper roller bearing mounting for locomotive crossheads and the like comprising a rod having an opening in its end, a pin mounted in said opening with a tapering portion projecting beyond said rod, a taper roller bearing on said projecting portion of said pin including taper rollers running on said tapering portion of said pin and a bearing cup having an internal thrust rib engaging the large ends of said rollers, the outer face of said thrust rib and cup being adjacent to said rod, and a friction plate of bearing metal or the like covering the end face of said cup and thrust rib and extending into close proximity with said rod, said plate having an annular flange pressed into the inner periphery of said thrust rib.

TRACY V. BUCKWALTER.